(12) United States Patent
Munje et al.

(10) Patent No.: US 7,433,961 B2
(45) Date of Patent: Oct. 7, 2008

(54) SYSTEM AND METHOD FOR SEQUENTIALLY CONDUCTING INDEPENDENT DATA CONTEXTS USING A MOBILE COMMUNICATIONS DEVICE

(75) Inventors: Arun Munje, Kanata (CA); Kenneth Liang, Kanata (CA); Mahmud-Ul Hassan, Kanata (CA)

(73) Assignee: Research In Motion Limited, Waterloo (CA)

( * ) Notice: Subject to any disclaimer, the term of this patent is extended or adjusted under 35 U.S.C. 154(b) by 731 days.

(21) Appl. No.: 10/990,073

(22) Filed: Nov. 16, 2004

(65) Prior Publication Data

US 2006/0104246 A1    May 18, 2006

(51) Int. Cl.
*G06F 15/13* (2006.01)
(52) U.S. Cl. .................. 709/230; 709/203; 709/234; 370/352; 455/406; 455/419
(58) Field of Classification Search .............. 709/203, 709/230, 234; 370/352; 455/406, 419
See application file for complete search history.

(56) References Cited

U.S. PATENT DOCUMENTS

| | | | |
|---|---|---|---|
| 5,940,383 A | | 8/1999 | Willkie |
| 6,615,269 B1* | | 9/2003 | Suumaki et al. ............. 709/230 |
| 6,636,502 B1* | | 10/2003 | Lager et al. .................. 370/352 |
| 6,879,820 B2* | | 4/2005 | Bjelland et al. .............. 455/406 |
| 7,266,371 B1* | | 9/2007 | Amin et al. .................. 455/419 |
| 2003/0060210 A1* | | 3/2003 | Ravishankar et al. ........ 455/452 |

FOREIGN PATENT DOCUMENTS

DE    100 46 345 A1    3/2002

OTHER PUBLICATIONS

European Search Report; European Patent Office; Apr. 13, 2005; 7 pages.
Examination Report; European Patent Office; Feb. 26, 2008; 6 pages.

* cited by examiner

*Primary Examiner*—Jinsong Hu
(74) *Attorney, Agent, or Firm*—Danamraj & Emanuelson, P.C.

(57) ABSTRACT

A mobile communications device includes logic operable to conduct a data context associated with a first application of the mobile communications device with a data service network. The mobile communications device also includes logic operable to release the data context associated with the first application and establish a data context associated with a second application of the mobile communications device with the data service network responsive to one of the user executing a hold function and the second application requesting that a data context be associated therewith. The mobile communications device further includes logic operable to reestablish the data context associated with the first application responsive to one of the user executing a resume function, the second application releasing the data context associated therewith, data transmission within the data context associated with the second application ceasing for a first predetermined time period and a second predetermined time period elapsing.

23 Claims, 5 Drawing Sheets

SYSTEM AND METHOD FOR SEQUENTIALLY CONDUCTING INDEPENDENT DATA CONTEXTS USING A MOBILE COMMUNICATIONS DEVICE

TECHNICAL FIELD OF THE APPLICATION

The present disclosure relates, in general, to wireless packet data service networks and, in particular, to a system and method for sequentially conducting independent data contexts using a mobile communications device operable to be disposed in the wireless packet data service network.

BACKGROUND

It is becoming commonplace to use wireless packet data service networks for effectuating data sessions with mobile communications devices. For example, mobile communications devices may be used to provide a continually operable data service for wirelessly extending corporate data and applications such as email and personal information management to mobile users. Many of these mobile communications devices, however, are capable of supporting only one PDP context at a time. As such, a user desiring to take advantage of such a continually operable data service may not be able to use all of the functionality of the mobile communications device. Accordingly, a need has arisen for system and method for sequentially conducting independent PDP contexts using the wireless packet data service network via a mobile communications device that allows the user to experience not only the continually operable data service functionality, but also, other data service functionality of the mobile communications device.

SUMMARY

Disclosed herein are a system and method for sequentially conducting independent PDP contexts within a wireless packet data service network via a mobile communications device that allows the user to experience not only a continually operable data service functionality, but also, other data service functionality of the mobile communications device. Specifically, the mobile communications device includes logic operable to conduct a data context associated with a first application between the mobile communications device and a data service network. The mobile communications device also includes logic operable to release the data context associated with the first application and establish a data context associated with a second application of the mobile communications device responsive to one of the user executing a hold function and the second application requesting that a data context be associated therewith.

In addition, the mobile communications device includes logic operable to reestablish the data context associated with the first application responsive to one of the user executing a resume function, the second application releasing the data context associated therewith, data transmission within the data context associated with the second application ceasing for a first predetermined time period and a second predetermined time period elapsing.

In one embodiment, the data context associated with the first application of the mobile communications device may be a PDP context. Likewise, the data context associated with the second application of the mobile communications device may be a PDP context. In another embodiment, the data service network may be a wireless packet data service network selected from one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access (CDMA) network and a Universal Mobile Telecommunications System (UMTS) network.

In one embodiment, the mobile communications device may include logic operable to prompt the user for acknowledgment prior to releasing the data context associated with the first application. Likewise, the mobile communications device may include logic operable to prompt the user for acknowledgment prior to reestablishing the data context associated with the first application.

In another embodiment, the first application may be a continually operable data services application such as an email application, a calendering application or the like. In this embodiment, the second application may be a non continually operable data services application such as a web browsing application.

In a further embodiment, the user executing a hold function may include one of the user selecting an icon and the user selecting a menu item from a user interface of the mobile communications device. Likewise, the user executing a resume function may include one of the user selecting an icon and the user selecting a menu item from the user interface of the mobile communications device.

BRIEF DESCRIPTION OF THE DRAWINGS

For a more complete understanding of the features and advantages of the present method and mobile device, reference is now made to the detailed description along with the accompanying figures in which corresponding numerals in the different figures refer to corresponding parts and in which.

DETAILED DESCRIPTION OF THE DRAWINGS

While various embodiments of a mobile communications device operating within a network system are discussed in detail below, it should be appreciated that the present disclosure provides many applicable inventive concepts which can be embodied in a wide variety of specific contexts. The specific embodiments discussed herein are merely illustrative of specific ways to use the mobile communications device within the network system, and do not delimit the scope of the present disclosure.

Figure 1:
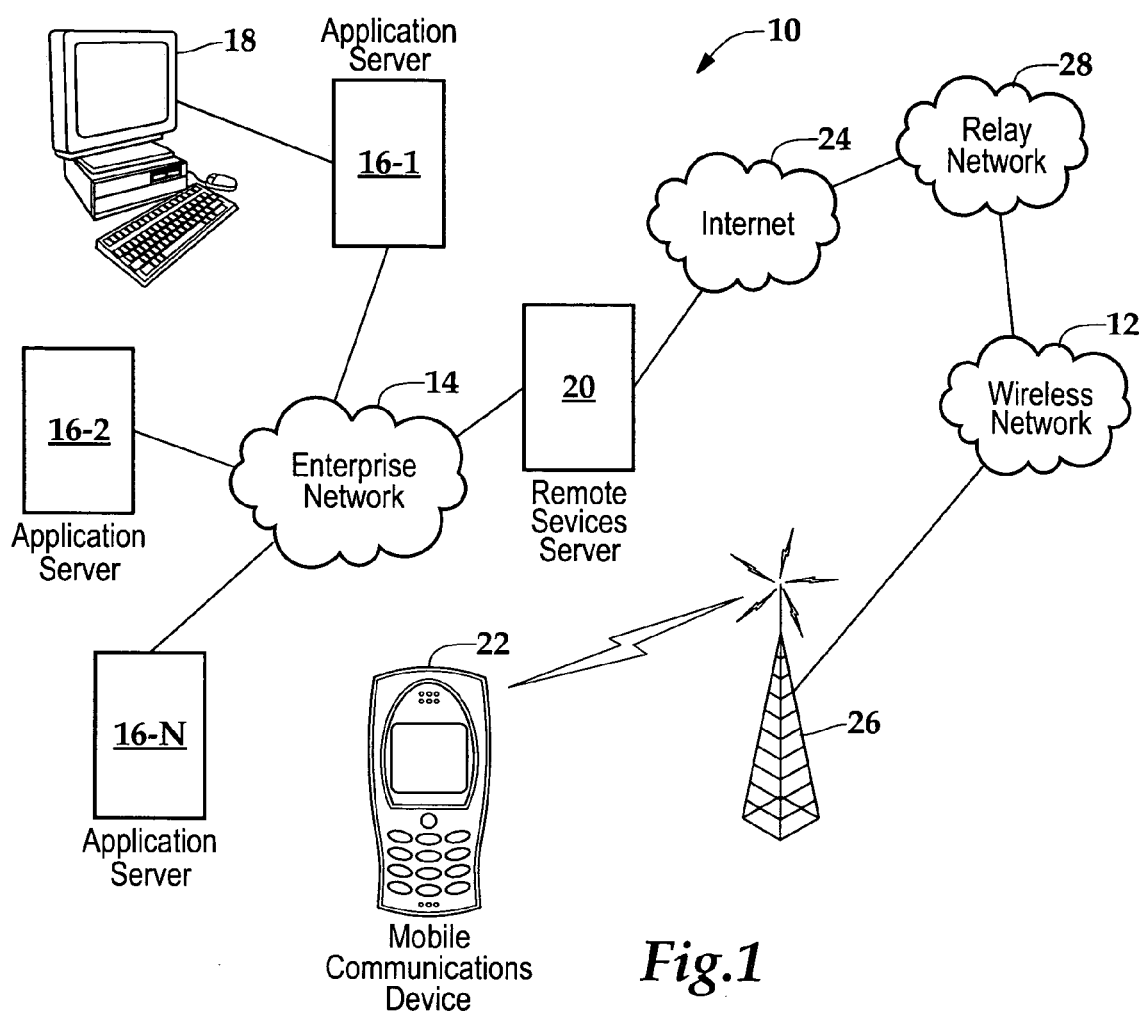
FIG. 1 depicts an exemplary network environment including a wireless packet data service network wherein an embodiment of the present method may be practiced.

Referring now to the drawings, and more particularly to FIG. 1, depicted therein is an exemplary network environment 10 including a wireless packet data service network 12 wherein an embodiment of the present method may be practiced. An enterprise network 14 for serving a plurality of corporate users, which may be a packet-switched network, can include one or more geographic sites and be organized as a local area network (LAN), a wide area network (WAN), a metropolitan area network (MAN) or the like. A number of application servers 16-1 through 16-N disposed as part of the enterprise network 14 are operable to provide or effectuate a host of internal and external services such as Internet access, corporate data access, information management and the like as well as certain continually operable data services such as email, video mail, messaging, calendaring, scheduling and the like. Accordingly, a diverse array of personal information appliances 18 such as desktop computers, laptop computers, palmtop computers or the like may be operably networked to one or more of the application servers 16-i, i=1, 2, . . . ,N, with respect to the services supported in the enterprise network 14.

Additionally, a remote services server 20 may be interfaced with the enterprise network 14 for enabling a corporate user to access or effectuate any of the services from a remote location using a suitable mobile communications device (MCD) 22. A secure communication link with end-to-end encryption may be established that is mediated through an external IP network, i.e., a public packet-switched network such as the Internet 24, as well as the wireless packet data service network 12 operable with MCD 22 via suitable wireless network infrastructure that includes a base station 26. In one embodiment, a trusted relay network 28 may be disposed between the Internet 24 and the infrastructure of wireless packet data service network 12. By way of example, MCD 22 may be a data-enabled handheld device capable of receiving and sending messages, web browsing, interfacing with corporate application servers and the like.

For purposes of the present disclosure, the wireless packet data service network 12 may be implemented in any known or heretofore unknown mobile communications technologies and network protocols, as long as a packet-switched data service is available therein for transmitting packetized information. For instance, the wireless packet data service network 12 may be comprised of a General Packet Radio Service (GPRS) network that provides a packet radio access for mobile devices using the cellular infrastructure of a Global System for Mobile Communications (GSM)-based carrier network. In other implementations, the wireless packet data service network 12 may comprise an Enhanced Data Rates for GSM Evolution (EDGE) network, an Integrated Digital Enhanced Network (IDEN), a Code Division Multiple Access (CDMA) network, a Universal Mobile Telecommunications System (UMTS) network, or any 3rd Generation (3G) network. As will be seen hereinbelow, the embodiments of the present disclosure for sequentially conducting independent data contexts using a MCD will be described regardless of any particular wireless network implementation.

Figure 2:
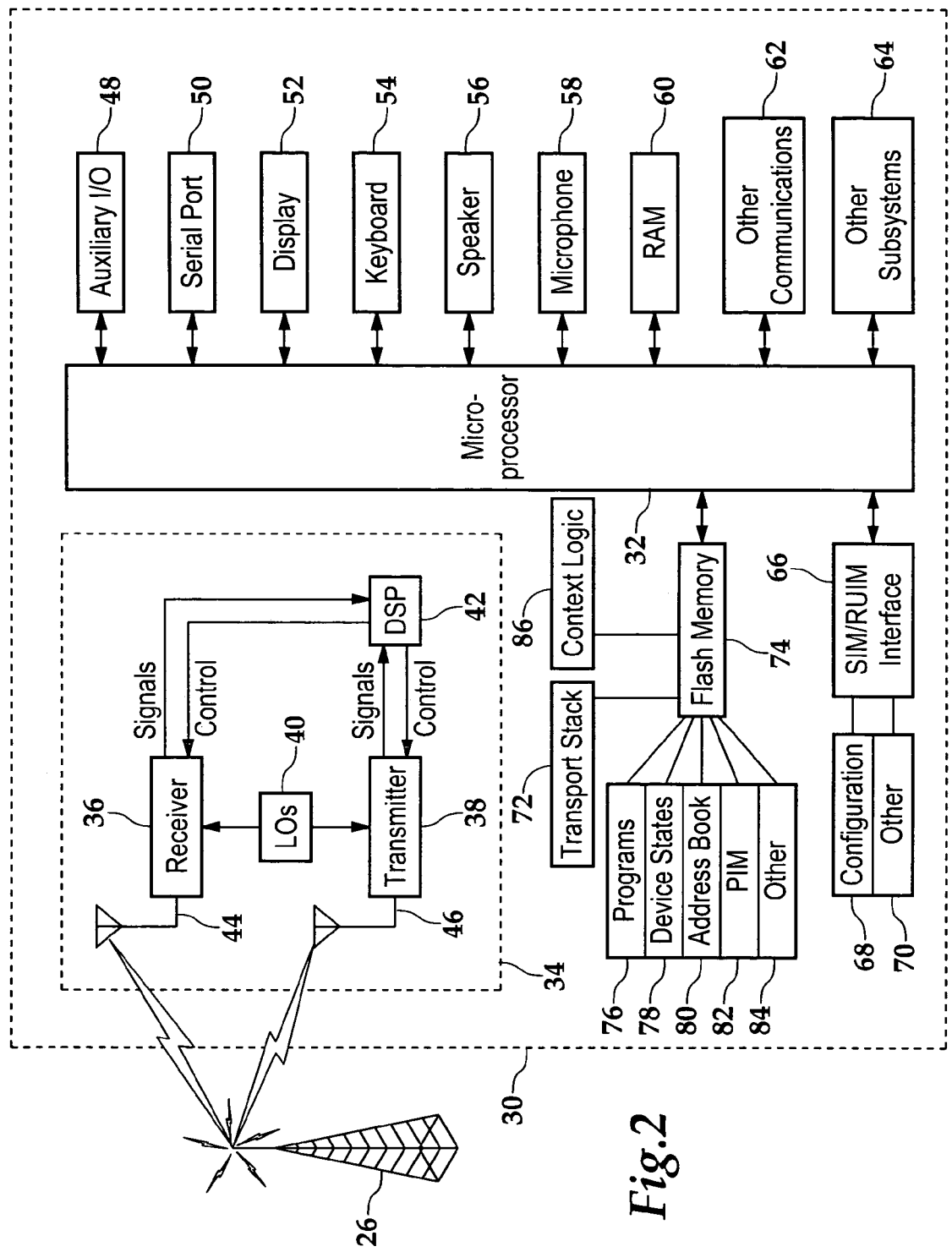
FIG. 2 depicts a block diagram of a mobile communications device according to one embodiment of the present disclosure.

FIG. 2 depicts a block diagram of a mobile communications device that supports continually operable data service and that is generally designated 30. It will be recognized by those skilled in the art upon reference hereto that although an embodiment of MCD 30 may comprise an arrangement similar to one shown in FIG. 2, there can be any number of variations and modifications, in hardware, software or firmware, with respect to the various modules depicted. Accordingly, the arrangement of FIG. 2 should be taken as illustrative rather than limiting with respect to the embodiments of the present disclosure. A microprocessor 32 providing for the overall control of MCD 30 is operably coupled to a communication subsystem 34 which includes a receiver 36 and transmitter 38 as well as associated components such as one or more local oscillator (LO) modules 40 and a processing module such as a digital signal processor (DSP) 42. As will be apparent to those skilled in the field of communications, the particular design of the communication module 34 may be dependent upon the communications network with which the mobile device is intended to operate.

In one embodiment, the communication module 34 is operable with both voice and data communications. Regardless of the particular design, however, signals received by antenna 44 through base station 26 are provided to receiver 36, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 42, and provided to transmitter 44 for digital-to-analog (D/A) conversion, frequency up conversion, filtering, amplification and transmission over the air-radio interface via antenna 46.

Microprocessor 32 also interfaces with further device subsystems such as auxiliary input/output (I/O) 48, serial port 50, display 52, keyboard 54, speaker 56, microphone 58, random access memory (RAM) 60, a short-range communications subsystem 62 and any other device subsystems generally labeled as reference numeral 64. To control access, a Subscriber Identity Module (SIM) or Removable user Identity Module (RUIM) interface 66 is also provided in communication with the microprocessor 32. In one implementation, SIM/RUIM interface 66 is operable with a SIM/RUIM card having a number of key configurations 68 and other information 70 such as identification and subscriber-related data.

Operating system software and software associated with transport stack 72 may be embodied in a persistent storage module (i.e., non-volatile storage) such as Flash memory 74. In one implementation, Flash memory 74 may be segregated into different areas, e.g., storage areas for computer programs 76, device states 78, address book 80, other personal information manager (PIM) data 82 and other data storage areas generally labeled as reference numeral 84. Additionally, a data context logic module 86 is provided for regulating and scheduling application access to communications sessions with wireless packet data service network 12 according to the teachings set forth herein.

Figure 3:
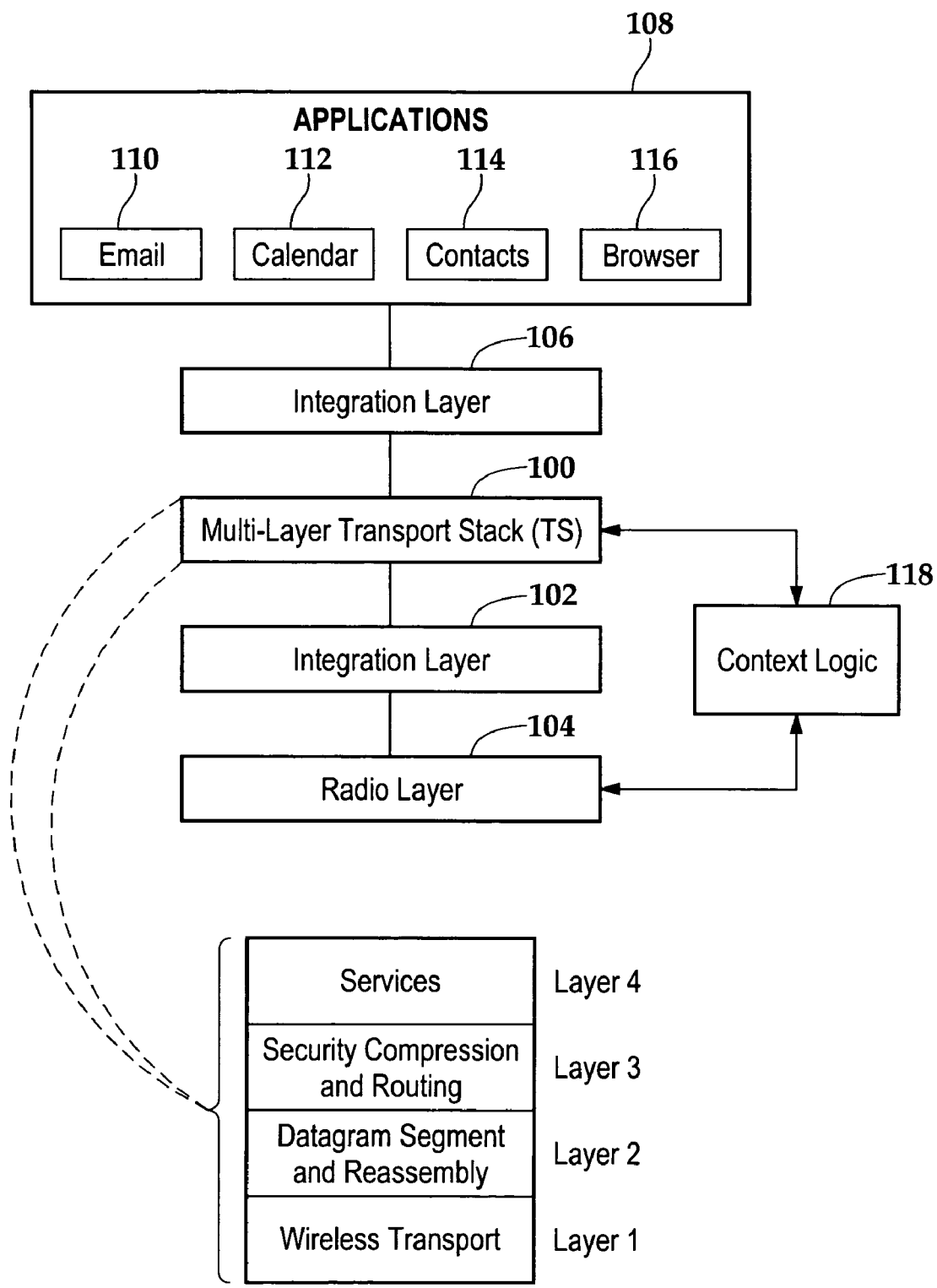
FIG. 3 depicts a software architectural view of a mobile communications device according to one embodiment of the present disclosure.

FIG. 3 depicts a software architectural view of a mobile communications device operable according to one embodiment for regulating and scheduling application access to communications sessions with wireless packet data service network 12 regardless of the manufacturer of the MCD or the wireless service provider. A multi-layer transport stack (TS) 100 is operable to provide a generic data transport protocol for any type of corporate data, including email, via a reliable, secure and seamless continuous connection to a wireless packet data service network. As illustrated in the embodiment of FIG. 3, an integration layer 102 is operable as an interface between the MCD's radio layer 104 and the transport stack 100. Likewise, another integration layer 106 is provided for interfacing between the transport stack 100 and the user applications 108 supported on the MCD, e.g., email 110, calendar/scheduler 112, contact management 114 and web browser 116. Although not specifically shown, the transport stack 100 may also be interfaced with the MCD's operating system. In another implementation, the transport stack 100 may be provided as part of a data communications client module operable as a host-independent virtual machine on a mobile device.

The bottom layer (Layer 1) of the transport stack 100 is operable as an interface to the wireless network's packet layer. Layer 1 handles basic service coordination within the exemplary network environment 10 shown in FIG. 1. For example, when an MCD roams from one carrier network to another, Layer 1 verifies that the packets are relayed to the appropriate wireless network and that any packets that are pending from the previous network are rerouted to the current network. The top layer (Layer 4) exposes various application interfaces to the services supported on the MCD. The remaining two layers, Layer 2 and Layer 3, are responsible for datagram segmentation/reassembly and security, compression and routing, respectively.

FIG. 3 also depicts a data context logic module 118 provided as part of the MCD's software environment that is disposed in operable communication with the transport stack 100 and radio layer 104 as well as the OS environment for regulating and scheduling application access to communications sessions with wireless packet data service network 12. In one implementation, data context logic module 118 is operable to release the data context associated with a first application, for example, a continually operable data services application such as email 110 or calendar 112 and establish a data context associated with a second application, such as browser 116, responsive to the user of the MCD executing a hold function by, for example, launching a hold application operably associated with the first application by selecting an icon or menu item from the user interface 52 of the MCD.

Data context logic module 118 is also operable to release the data context associated with the first application and establish a data context associated with the second application, responsive to a request for a data context by the second application. For example, the user may attempt to launch browser application 116 while email application 110 holds the only data context or the last data context available between the MCD and the network 12. In t his case, data context logic module 118 may prompt the user to acknowledge that email application 110 should release its data context or context logic module 118 may automatically cause the release of the data context of email application 110. In either case, the data context for browser application 116 can then be established.

In the present example, since email application 110 is a continually operable data services application, it is desirable that the data context for email application 110 be reestablished as quickly as possible. As such, data context logic module 118 is operable to reestablish the data context associated with the first application responsive to the user executing a resume function by, for example, launching a resume application operably associated with the first application by selecting an icon or menu item from the user interface 52 of the MCD. Data context logic module 118 then releases the data context for browser application 116 and reestablishes the data context for email application 110.

Even if the user does not initiate the resume function, in one implementation, data context logic module 118 will automatically reestablish the data context for email application 110 responsive to browser application 116 releasing its data context by, for example, the user shutting down browser application 116 or a time out associated with browser application 116. Likewise, in one implementation, data context logic module 118 will reestablish the data context for email application 110 responsive to determining that data transmissions within the data context associated with browser application 116 have ceased for a first predetermined time period such as for several minutes. In this case, data context logic module 118 may prompt the user to acknowledge that browser application 116 should release its data context or simply automatically cause the release of the data context of browser application 116.

Alternatively or additionally, in one implementation, data context logic module 118 will reestablish the data context for email application 110 responsive to determining that a second predetermined time period such as ten to twenty minutes has elapsed. In this case, data context logic module 118 may prompt the user to acknowledge that browser application 116 should release its data context or simply automatically cause the release of the data context of browser application 116 and reestablishment of the data context of email application 110. As such, data context logic module 118 is operable to regulate and schedule application access to communications sessions while substantially maintaining the data context for a continually operable data services application such as email application 110.

Figure 4:
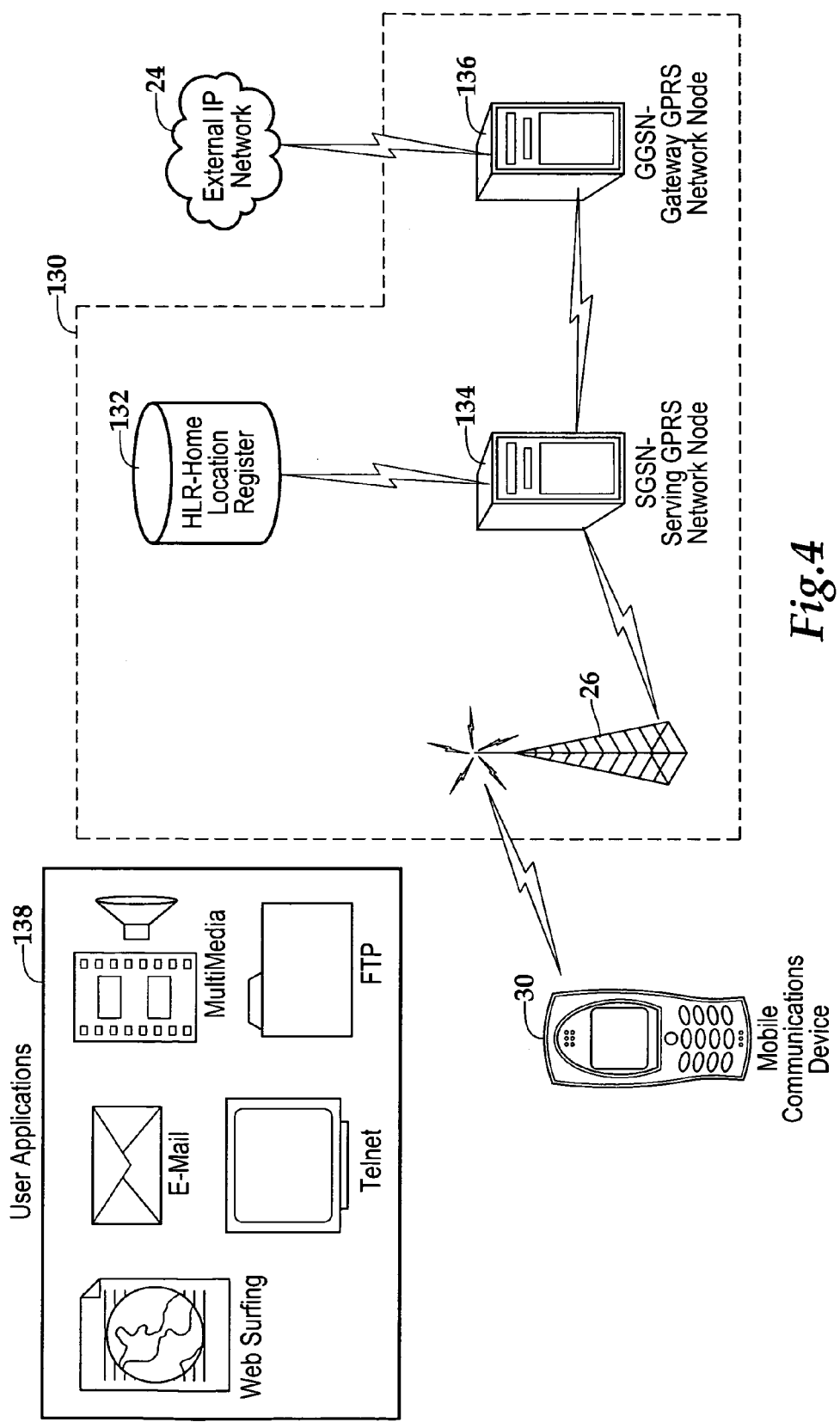
FIG. 4 depicts additional details of an exemplary wireless packet data service network operable with a mobile communications device in accordance with an embodiment of the present disclosure.

FIG. 4 depicts additional details of an exemplary wireless packet data service network operable with a mobile communications device in accordance with an embodiment. As illustrated, reference numeral 130 refers to a GPRS network operable as the wireless packet data service network with respect to MCD 30 that is provided with a number of data-centric user applications 138 such as, e.g., web browsing, email, multimedia, File Transfer Protocol or FTP, telnet and the like. Base station 26 serves MCD 30 via the air interface using applicable radio layer protocols.

GPRS uses a packet-switching technique to transfer both high-speed and low-speed data and signaling in an efficient manner over GSM radio networks. Packet switching means that GPRS radio resources are used only when users are actually sending or receiving data. Rather than dedicating a radio channel to a mobile data user, e.g., MCD 30, for a fixed period of time, the available radio channels can be concurrently shared between several users. Therefore, GPRS is designed to support from intermittent and bursty data transfers (e.g., web browsing) to occasional transmission of large volumes of data (e.g., FTP). Allocation of GPRS radio channels can be flexible: from 1 to 8 radio interface timeslots can be allocated per one Time Division Multiple Access (TDMA) frame. Typically, timeslots are shared by the active users, and uplinks and downlinks are allocated separately. Various radio channel coding schemes are available to allow a range of data bit transfer rates.

Two additional network nodes are provided within a GSM network in order to implement a packet-switched data transfer service. A Serving GPRS Support Node (SGSN) 134, which is coupled to a Home Location Register (HLR) 132 and disposed at the same hierarchical level as a Mobile Switching Center (MSC) of the circuit-switched cellular network, is operably coupled to base station 26 and keeps track of the location of a GPRS user such as the user of MCD 30. Further, SGSN 134 is responsible for performing security functions and handling access control with respect to MCD 30. A Gateway GPRS Support Node (GGSN) 136 provides interworking with the external packet-switched IP network 24, and is operably coupled to one or more SGSNs, e.g., SGSN 134, via an IP-based GPRS backbone network.

In order to access the packet data service, MCD 30 makes its presence known to the network by performing what is known as a GPRS Attach. Thereafter, to send and receive packet data, MCD 30 activates the packet data address that it wants to use. This operation renders MCD 30 "visible" in the corresponding GGSN, and interworking with external data networks can then begin. User data is transferred transparently between MCD 30 and the external data networks with a method known as encapsulation and tunneling wherein data packets are equipped with GPRS-specific protocol information and transferred transparently between MCD 30 and GGSN 136 using, for example, a Packet Data Protocol (PDP) context between MCD 30 and GPRS network 130.

Figure 5:
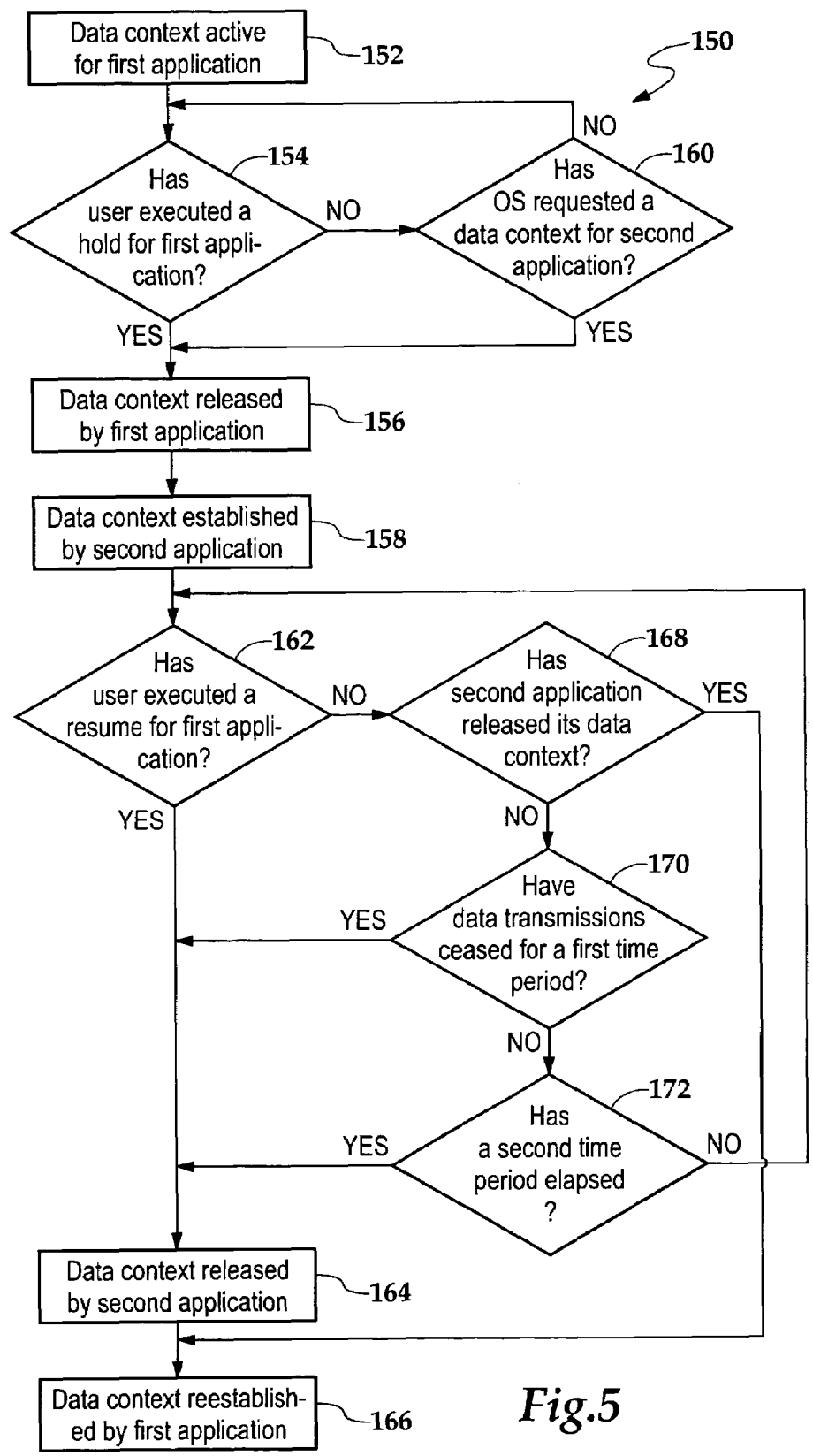
FIG. 5 depicts a flowchart of an embodiment for sequentially conducting independent PDP contexts using the wireless packet data service network operable with a mobile communications device in accordance with an embodiment of the present disclosure.

FIG. 5 depicts a flowchart of an embodiment for establishing sequential PDP contexts between a MCD and a network using, for example, an MCD that only supports a single PDP context. Those of ordinary skill in the art, however, should recognize that the present disclosure is not only applicable to single PDP context MCDs but also to any MCD/network system wherein the two required PDP contexts cannot simultaneously be active including, but not limited to, a MCD currently conducting its maximum number of PDP contexts, a network capable of supporting only one PDP context with a given MCD or the like.

Specifically, as detailed in method 150 of FIG. 5, whenever a data context for a continually operable data services application, the first application, is active (block 152), the data context logic module is operable to identify other operations of the MCD that request a data context. For example, the data context logic module determines whether the user of the MCD has executed a hold function (block 154). If the user has executed the hold function, the data context associated with the first application is released (block 156) and the first application may, for example, operate in the background. After the data context associated with the first application has been released, a data context associated with a second application may be established (block 158). Alternatively, if the user of the MCD has not executed the hold function (block 154) but another application has requested a data context (block 160), then the data context associated with the first application is again released (block 156) and a data context associated with a second application may be established (block 158). If the user of the MCD has not executed a hold function (block 154) and no other application has requested a data context (block 160), then the data context logic module continues to identify whether other operations of the MCD are requesting a data context.

Once a data context associated with the second application has been established, as the first application is a continually operable data services application, the data context logic module now operates to determine when to reestablish the data context for the first application. In this regard, the data context logic module determines whether the user of the MCD has executed the resume function (block 162). If the user has executed the resume function, the data context associated with the second application is released (block 164) and a data context associated with the first application may be reestablished (block 166). Alternatively, if the user of the MCD has not executed a resume function (block 162) but the second application has released its data context (block 168), then a data context associated with the first application may be reestablished (block 166).

If the user has not executed the resume function (block 162) and the second application has not released its data context (block 168), then the data context logic module determines whether there are data transmissions within the data context associated with the second application (block 170). If there is no data transmission for a specific time period, then the data context associated with the second application is released (block 164) and a data context associated with the first application may be reestablished (block 166). Additionally, even if the user has not executed the resume function (block 162), the second application has not released its data context (block 168) and data transmissions within the data context associated with the second application are occurring (block 170), the data context logic module determines whether a specific time period has elapsed (block 172). If this specific time period has past, the data context associated with the second application is released (block 164) and a data context associated with the first application may be reestablished (block 166). If the specific time period has not elapsed (block 172), the data context logic module continues to operate to determine when to reestablish the data context for the first application.

As stated above, in some implementations, prior to releasing a given data context, the user of the MCD may be prompted to acknowledge that such data context should be released. Alternatively, the data context logic module may automatically cause the release of the given data context based upon to above-described criteria.

While this disclosure has described a mobile communications device operating within a network system with reference to illustrative embodiments, this description is not intended to be construed in a limiting sense. Various modifications and combinations of the illustrative embodiments as well as other embodiments, will be apparent to persons skilled in the art upon reference to the description. It is, therefore, intended that the appended claims encompass any such modifications or embodiments.

What is claimed is:

1. A method for providing a substantially continually operable packet data context with a mobile communications device comprising:

conducting a first packet data protocol (PDP) context associated with a first substantially continually operable data services application of the mobile communications device;

releasing the first PDP context associated with the first substantially continually operable data services application and establishing a second PDP context associated with a second application of the mobile communications device responsive to a user's execution of a hold function; and releasing the second PDP context and reestablishing the first PDP context associated with the first substantially continually operable data services application responsive to the user of the mobile communications device executing a resume function.

2. The method as recited in claim 1 wherein the PDP contexts associated with the first and second applications occur within a wireless packet data service network.

3. The method as recited in claim 2 wherein the wireless packet data service network further comprises one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access network and a Universal Mobile Telecommunications System (UMTS) network.

4. The method as recited in claim 1 further comprising prompting the user for acknowledgment prior to releasing the PDP context associated with the first application.

5. The method as recited in claim 1 further comprising prompting the user for acknowledgment prior to reestablishing the PDP context associated with the first application.

6. The method as recited in claim 1 wherein the first application is a continually operable data services application.

7. The method as recited in claim 1 wherein the first application further comprises at least one of an email application and a calendering application.

8. The method as recited in claim 1 wherein the second application is not a continually operable data services application.

9. The method as recited in claim 1 wherein the second application is a web browsing application.

10. The method as recited in claim 1 wherein the user executing a hold function further comprises one of the user selecting an icon and the user selecting a menu item from a user interface of the mobile communications device.

11. The method as recited in claim 1 wherein the user executing a resume function further comprises one of the user selecting an icon and the user selecting a menu item from a user interface of the mobile communications device.

12. A mobile communications device comprising:
a processor operable to:
conduct a first packet data protocol (PDP) context associated with a first substantially continually operable data services application of the mobile communications device with a data service network;
release the first PDP context associated with the first substantially continually operable data services application and establish a second PDP context associated with a second application of the mobile communications device with the data service network responsive to a user's execution of a hold function; and
release the second PDP context and reestablish the first PDP context associated with the first substantially continually operable data services application responsive to the user of the mobile communications device executing a resume function.

13. The mobile communications device as recited in claim 12 wherein the data service network further comprises a wireless packet data service network.

14. The mobile communications device as recited in claim 13 wherein the wireless packet data service network further comprises one of a General Packet Radio Service (GPRS) network, an Enhanced Data Rates for Global System for Mobile Communications (GSM) Evolution (EDGE) network, a 3rd Generation (3G) network, an Integrated Digital Enhanced Network (IDEN), a Code Division Multiple Access network and a Universal Mobile Telecommunications System (UMTS) network.

15. The mobile communications device as recited in claim 12 wherein the processor is operable to prompt the user for acknowledgment prior to releasing the PDP context associated with the first application.

16. The mobile communications device as recited in claim 12 wherein the processor is operable to prompt the user for acknowledgment prior to reestablishing the PDP context associated with the first application.

17. The mobile communications device as recited in claim 12 wherein the first application is a continually operable data services application.

18. The mobile communications device as recited in claim 12 wherein the first application further comprises at least one of an email application and a calendering application.

19. The mobile communications device as recited in claim 12 wherein the second application is not a continually operable data services application.

20. The mobile communications device as recited in claim 12 wherein the second application is a web browsing application.

21. The mobile communications device as recited in claim 12 wherein the user executing a hold function further comprises one of the user selecting an icon and the user selecting a menu item from a user interface of the mobile communications device.

22. The mobile communications device as recited in claim 12 wherein the user executing a resume function further comprises one of the user selecting an icon and the user selecting a menu item from a user interface of the mobile communications device.

23. A mobile communications device comprising:
a processor operable to:
conduct a first packet data protocol (PDP) context associated with a first substantially continually operable electronic mail application of the mobile communications device with a data service network;
release the first PDP context associated with the first substantially continually operable electronic mail application and establish a second PDP context associated with a non continually operable electronic mail application of the mobile communications device with the data service network responsive to a user's execution of a hold function; and
release the second PDP context and reestablish the first PDP context associated with the first substantially continually operable electronic mail application responsive to the user's execution of a resume function.

* * * * *